United States Patent
Leonard et al.

(10) Patent No.: US 10,477,178 B2
(45) Date of Patent: Nov. 12, 2019

(54) HIGH-SPEED AND TUNABLE SCENE RECONSTRUCTION SYSTEMS AND METHODS USING STEREO IMAGERY

(71) Applicant: Massachusetts Institute of Technology, Cambridge, MA (US)

(72) Inventors: John Joseph Leonard, Newton, MA (US); Sudeep Pillai, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 266 days.

(21) Appl. No.: 15/637,499

(22) Filed: Jun. 29, 2017

(65) Prior Publication Data

US 2019/0020861 A1    Jan. 17, 2019

Related U.S. Application Data

(60) Provisional application No. 62/356,873, filed on Jun. 30, 2016.

(51) Int. Cl.
G06K 9/32 (2006.01)
H04N 13/111 (2018.01)
(Continued)

(52) U.S. Cl.
CPC .......... H04N 13/111 (2018.05); G06T 7/593 (2017.01); G06T 17/20 (2013.01); H04N 13/239 (2018.05);
(Continued)

(58) Field of Classification Search
None
See application file for complete search history.

(56) References Cited

U.S. PATENT DOCUMENTS 7,292,257 B2 * 11/2007 Kang ............... G06T 15/205
                                                    345/419
9,595,110 B2 *  3/2017 Saitoh .............. G01S 17/026
(Continued)

OTHER PUBLICATIONS

A Taxonomy—Algorithms, Daniel Scharstein et al., 2001, Microsoft resaerch, pp. 1-59 (Year: 2001).*
(Continued)

Primary Examiner — Jayesh A Patel
(74) Attorney, Agent, or Firm — Daly, Crowley, Mofford & Durkee, LLP

(57) ABSTRACT

A tunable and iterative stereo mapping technique is provided, capable of identifying disparities at or substantially faster than real-time (e.g., frame-rate of 120 Hz). The method includes identifying a plurality of points in an image, determining disparity values for each of the points in the image and generating a piece-wise planar mesh based on the points and their respective disparity values. A disparity interpolation can be performed on candidate planes using estimated plane parameters for the candidate planes and a disparity image can be generated having a plurality of regions based on the disparity interpolation. Multiple iterations can be performed until the image is reconstructed with an appropriate resolution based on predetermined thresholds. The thresholds can be modified to provide a tunable system by changing the threshold values to either increase a resolution of a final reconstructed image and/or increase a computation speed of the tunable and iterative stereo mapping technique.

21 Claims, 11 Drawing Sheets

(51) Int. Cl.
G06T 17/20 (2006.01)
H04N 13/239 (2018.01)
G06T 7/593 (2017.01)
H04N 13/00 (2018.01)

(52) U.S. Cl.
CPC .............. G06T 2207/10012 (2013.01); H04N 2013/0081 (2013.01)

(56) References Cited

U.S. PATENT DOCUMENTS

| | | | | |
|---|---|---|---|---|
| 2002/0061131 | A1* | 5/2002 | Sawhney | G06T 15/205 382/154 |
| 2005/0286759 | A1* | 12/2005 | Zitnick, III | G06T 15/205 382/154 |
| 2013/0083994 | A1* | 4/2013 | Ren | G06T 7/593 382/154 |
| 2013/0089269 | A1* | 4/2013 | Barnum | G06T 5/003 382/261 |
| 2013/0135441 | A1* | 5/2013 | Deng | G06T 7/593 348/47 |
| 2017/0272723 | A1* | 9/2017 | Ren | H04N 13/239 |

OTHER PUBLICATIONS

A Taxonomy—Algorithms, Daniel Scharstein et al., 2001, Microsoft research, pp. 1-59 (Year: 2001).*
MeshStereo—Interpolation., Chi Zhang et al., ICCV, 2015, pp. 2057-2065 (Year: 2015).*
Computing—Network, Jure Zbontar et al., CVPR2015, 2015, pp. 1592-1599 (Year: 2015).*
Local stereo disparity—applications, Zhen Zhang et al., IEEE, 978-1-4673-2118-1, 2012, pp. 99-104 (Year: 2012).*
Banz, et al.; "Real-Time Stereo Vision System using Semi-Global Matching Disparity Estimation: Architecture and FPGA-Implementation"; International Conference on Embedded Computer systems 2010; 9 Pages.
Barry, et al.; "Pushbroom Stereo for High-speed Navigation in Cluttered Environments"; IEEE International conference on Robotics and Automation; 2015; 6 pages.
Bleyer, et al.; "PatchMatch Stereo—Stereo Matching with Slanted Support Window"; BMVC; vol. 11; pp. 1-11; 2011;11 pages.
Bleyer, et al.; "Stereo Marching—State—of—the—Art and Research Challenges"; Advanced Topics in Computer Vision; pp. 143-179; Jan. 2013; 35 pages.
Concha, et al.; "DPPTAM: Dense Piecewise Planar Tracking and Mapping from a Monocular Sequence"; IEEE International Conference on Intelligent Robots and Systems; Jul. 2015; 8 pages.
Engel, et al.; "LSD-SLAM: Large-Scale Direct Monocular SLAM"; European Conference on Computer Vision; 2014; 16 pages.
Gallup, et al.; "Real-Time Plane-Sweeping Stereo with Multiple Sweeping Directions"; IEEE Conference on Computer Vision and Pattern Recognition; pp. 1-8; 2007; 8 pages.
Gehrig, et al.; "A Real-Time Low-Power Stereo Vision Engine Using Semi-Global Matching"; Computer Vision Systems; 2009; 10 pages.
Geiger, et al.; "Are we ready for Autonomous Driving? The KITTI Vision Benchmark Suite"; IEEE Conference on Computer Vision and Pattern Recognition; 2012; 8 Pages.
Geiger, et al.; "Efficient Large-Scale Stereo Matching"; Computer Vision—ACCV; 2011; 14 Pages.
Geiger, et al.; "StereoScan: Dense 3d Reconstruction in Real-time"; IEEE Intelligent Vehicles Symposium; 2011; 6 Pages.
Hirschmuller, et al.; "Evaluation of Stereo Matching Costs on Images with Radiometric Differences"; IEEE Transactions on Pattern Analysis and Machine Intelligence; vol. 31, No. 9; pp. 1582-1599; 2009; 17 Pages.
Hirschmuller; "Accurate and Efficient Stereo Processing by Semi-Global Matching and Mutual Information"; IEEE Conference on Computer Vision and Pattern Recognition; vol. 2; 2005; 8 Pages.
Honegger, et al.; "Real-Time and Low Latency Embedded Computer Vision Hardware Based on a Combination of FPGA and Mobile CPU"; IEEE International Conference on Intelligent Robots and systems; 2014; 6 Pages.
Mur-Artal, et al.; "Probabilistic Semi-Dense Mapping from Highly Accurate Feature-Based Monocular SLAM"; Robotic Science and Systems; Rome, Italy; Jul. 2015; 9 Pages.
Pillai, et al.; "Monocular SLAM Supported Object Recognition"; Proceedings of Robotics: Science and Systems; Rome, Italy; Jul. 2015; 9 Pages.
Ramalingam, et al.; "Line-Sweep: Cross-Ratio for Wide-Baseline Matching and 3D Reconstruction"; IEEE Conference on Computer Vision and Pattern Recognition; 2015; 9 Pages.
Rosten, et al.; "Machine learning for high-speed corner detection"; European Conference on Computer Vision; pp. 430-443; 2006; 14 Pages.
Scharstein, et al.; "A Taxonomy and Evaluation of Dense Two-Frame Stereo Correspondence Algorithms" Int'l J. of Computer Vision; vol. 47, No. 1-3; 2002; 61 Pages.
Schauwecker, et al.; "A New Feature Detector and Stereo Matching Method for Accurate High-Performance Sparse Stereo Matching"; International Conference on Intelligent Robots and Systems; 2012; 6 Pages.
Veksler; "Dense Features for Semi-Dense Stereo Correspondence"; Int'l J. of Computer Vision; vol. 47, No. 1-3; 2002; 15 Pages.
Yang, et al.; "Spatial-Depth Super Resolution for Range Images"; IEEE Conference on Computer Vision and Pattern Recognition; pp. 1-8; 2007; 8 Pages.
Zabih, et al.; "Non-parametric Local Transforms for Computing Visual Correspondence"; European Conference on Computer Vision; pp. 151-158; 1994; 8 pages.
Zbontar, et al.; "Computing the Stereo Matching Cost with a Convolutional Neural Network"; IEEE Conference on Computer Vision and Pattern Recognition; 2015; 8 Pages.
Zhang, et al.; "MeshStereo: A Global Stereo Model with Mesh Alignment Regularization for View Interpolation"; IEEE International Conference on computer vision; pp. 2057-2065; 2015; 9 pages.

* cited by examiner

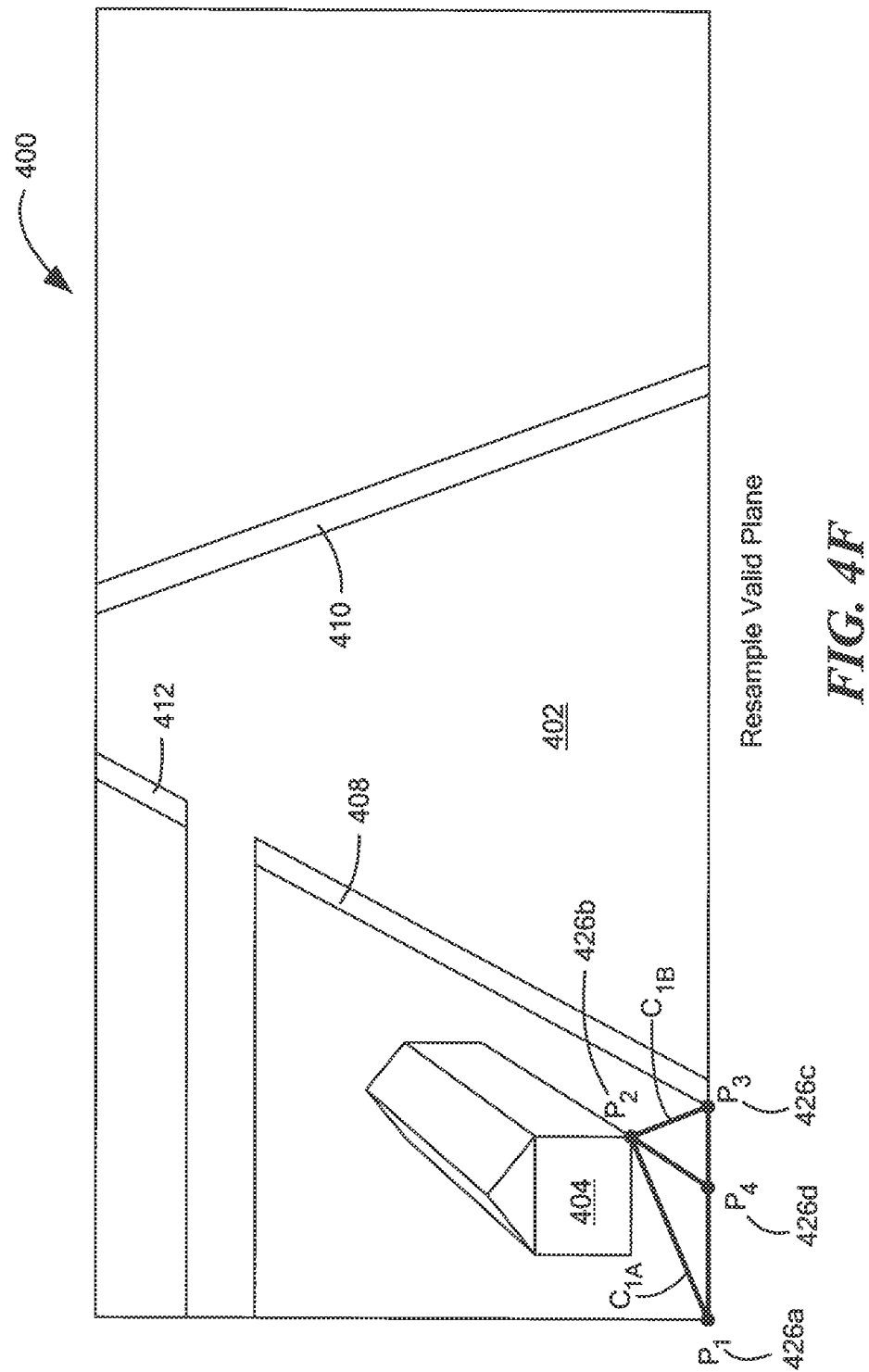

HIGH-SPEED AND TUNABLE SCENE RECONSTRUCTION SYSTEMS AND METHODS USING STEREO IMAGERY

CROSS-REFERENCE TO RELATED APPLICATION

The present application claims the benefit of U.S. Provisional Application 62/356,873, titled "HIGH-SPEED AND TUNABLE SCENE RECONSTRUCTION METHOD USING STEREO IMAGERY," filed on Jun. 30, 2016. The entire disclosure of which is hereby incorporated by reference in its entirety.

GOVERNMENT INTERESTS

This invention was made with Government support under Grant No. N00014-11-1-0688 awarded by the Office of Naval Research and under Grant No. IIS-1318392 awarded by the National Science Foundation. The Government has certain rights in the invention.

BACKGROUND

As is known in the art, stereo disparity estimation has been a classical and well-studied problem in computer vision, with applications in several domains including large-scale three-dimensional (3D) reconstruction, scene estimation and obstacle avoidance for autonomous driving and flight. State-of-the-art methods can be focused on improving the reconstruction quality on specific datasets, with the obvious trade-off of speed versus employing sophisticated and computationally expensive techniques to achieve a desired level of quality. Further, many of these methods achieve higher reconstruction quality at slow response times.

SUMMARY

The systems and methods described herein provide a tunable and iterative stereo mapping technique, capable of identifying disparities at or substantially faster than or close to real-time (e.g., frame-rate of 120 Hz). The methods described herein can perform multiple iterations until an image is reconstructed with an appropriate resolution based on predetermined thresholds. The thresholds can be modified to thus provide a tunable system. That is, by changing the threshold values to either increase a resolution of a final reconstructed image and/or increase a computation speed of the tunable and iterative stereo mapping technique. Thus, an iterative stereo disparity hypothesis and refinement technique is provided that offers tunable iteration parameters to adjust the accuracy-versus-speed trade-off requirement in real-time. Further, disparity values can be estimated having a high accuracy and low computational requirements.

In an embodiment, disparity estimation can iteratively approximate scene depth in an image via a piece-wise planar mesh from stereo imagery, with a fast depth validation step for semi dense reconstruction. The piece-wise planar mesh can be initially seeded with sparsely mapped points (e.g., key points) and can be recursively tessellated and refined through re-sampling, to provide the desired stereo disparity accuracy. The methods can be tuned to a desired reconstruction quality and/or run time performance, for example, for applications such as high-speed vehicles. In an embodiment, the systems and methods described herein can provide single view disparity estimates, as well as large-scale stereo reconstructions registered via stereo visual odometry.

In some embodiments, the tunable and iterative reconstruction technique can include constructing a depth prior construction from a Delaunay triangulation of sparse keypoint stereo matches, performing a disparity interpolation using piece-wise planar constraint imposed by a tessellation with known depths, performing a cost evaluation that validates interpolated disparities based on mapping cost threshold, and a re-sampling stage that establishes new support points from previously validated regions and via dense epipolar search.

The newly added support points can be re-tessellated and interpolated to hypothesize new candidate planes in the iterative process. In some embodiments, collision-prone obstacles and map structure in the immediate environment may be identified as key points in an image. Thus, the tunable and iterative reconstruction may focus on estimating the piece-wise planar reconstruction as an approximation to these scene features, and identify stereo disparities in a semi-dense fashion from this underlying representation. In an embodiment, the tunable and iterative reconstruction may be performed on only a subset of image pixels (e.g., identified points in the image) that have high image gradients and avoid reconstructing non-textured regions in the particular image.

In one aspect, a method comprises identifying a plurality of points in a first image, determining disparity values for each of the plurality of points in the first image and generating a piece-wise planar mesh based on the plurality of points and their respective disparity values through Delaunay triangulation. In an embodiment, the piece-wise planar mesh may include a plurality of candidate planes (e.g., planar surfaces). The method further comprises performing disparity interpolation on the plurality of candidate planes using the estimated plane parameters for each of the plurality of candidate planes and generating a disparity image having a plurality of regions based on the disparity interpolation. In an embodiment, each of the plurality of regions may include a plurality of disparity values for one or more of the plurality of points common to both the first and second image. The method further comprises determining a cost value for each of the plurality of regions based on their respective disparity values and comparing the cost value for each of the plurality of regions to a cost threshold.

In an embodiment, the method further comprises validating one or more of the plurality of regions when the respective cost value is less than the cost threshold. In some embodiments, the method comprises invalidating one or more of the plurality of regions when the respective cost value is greater than or equal to the cost threshold.

In an embodiment, a plurality of points in a second image may be identified. The plurality of points in the first image may be mapped to the plurality of points in the second image using their respective epipolar lines. In some embodiments, mapping points may be identified between the first and second images using an epipolar search.

In an embodiment, the method comprises determining a set of support points for each of the plurality of points in the first image. A concatenation value may be determined for each of the support points. In some embodiments, a piece-wise planar mesh may be generated using one or more of the support points as vertices.

In an embodiment, the method comprises identifying triangles from the plurality of candidate planes and identifying 3D parameters for each of the triangles. A lookup table may be generated for each of the candidate planes. The lookup table may include plane coefficients for each pixel in the respective candidate planes. In some embodiments, the method comprises performing Census window-based mapping between related regions in the first image and a second image. The cost value for each region may correspond to a disparity between the first and second images.

In some embodiments, the method comprises determining a grid size for each of the regions based on the respective cost value of the regions. The method may comprise reducing a grid size of each of the plurality of regions on each subsequent iteration.

In an embodiment, the method comprises resampling invalidated regions. A plurality of points may be identified in a first region of the first image that has been previously invalidated. In some embodiments, disparity values may be determined for each of the plurality of points in the first region and generating a piece-wise planar mesh based on the plurality of points and their respective disparity values through Delaunay triangulation, wherein the piece-wise planar mesh includes a plurality of candidate planes.

In an embodiment, the method further comprises performing disparity interpolation on the plurality of candidate planes using the estimated plane parameters for each of the plurality of candidate planes and generating a disparity image having a plurality of sub-regions in the first region based on the disparity interpolation. In an embodiment, a cost value may be determined for each of the plurality of sub-regions based on their respective disparity values and comparing the cost value for each of the plurality of sub-regions to a cost threshold.

BRIEF DESCRIPTION OF THE DRAWINGS

The foregoing concepts and features may be more fully understood from the following description of the drawings. The drawings aid in explaining and understanding the disclosed technology. Since it is often impractical or impossible to illustrate and describe every possible embodiment, the provided figures depict one or more illustrative embodiments. Accordingly, the figures are not intended to limit the scope of the concepts, systems and techniques described herein. Like numbers in the figures denote like elements.

DETAILED DESCRIPTION

Figure 1:
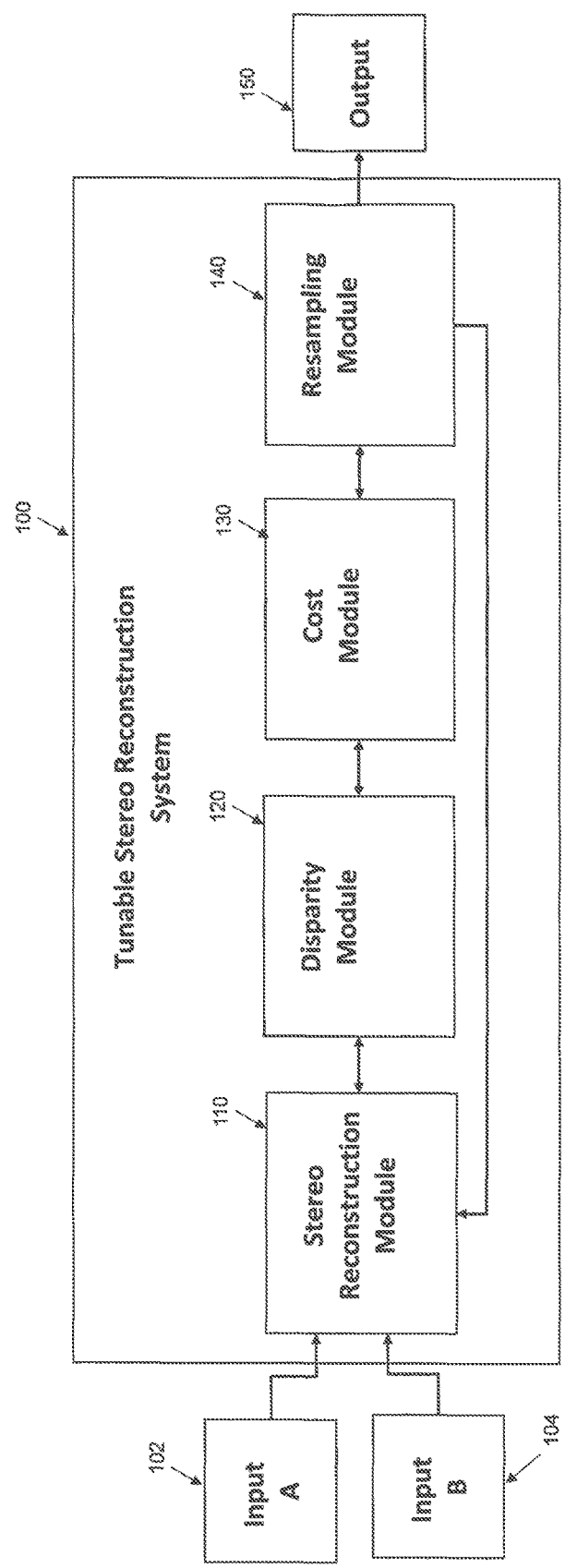
FIG. 1 is block diagram of a tunable stereo reconstruction system.

Described herein is a system for reconstructing a complete three-dimensional (3D) object model from a collection of images taken from known camera viewpoints. The system described herein is "tunable" in the sense that the system allows a trade-off to be made between the accuracy of the 3D reconstruction and the speed with which the 3D reconstruction is performed (i.e. a tunable stereo reconstruction system) and thus such a system finds use in a wide variety of applications. Such tuning is made via the selection of certain parameters to be described below. Before describing the details of such a system and the techniques associate therewith, some introductory concepts and terminology are explained.

An analog or continuous parameter image such as a still photograph may be represented as a matrix of digital values and stored in a storage device of a computer or other digital processing device. Some imaging devices may directly generate a digital image. Thus, as described herein, the matrix of digital data values are generally referred to as a "digital image" or more simply an "image" and may be stored in a digital data storage device, such as a memory for example, as an array of numbers representing the spatial distribution of energy at different wavelengths in a scene. In embodiments, an image may simply be processed without storage. Similarly, an image sequence such as a view of a street from a moving vehicle, for example, may be converted to a digital video signal as is generally known. The digital video signal is provided from a sequence of discrete digital images or frames. Each frame may be represented as a matrix of digital data values which may be stored in a storage device and/or simply processed (e.g. without storing) in a digital processing device. Thus, in the case of video signals, as described herein, a matrix of digital data values are generally referred to as an "image frame" or more simply an "image" or a "frame."

Each of the images in the digital video signal may be stored in a digital data storage device, such as a memory for example, as an array of numbers representing the spatial distribution of energy at different wavelengths in a scene in a manner similar to the manner in which an image of a still photograph is stored. Whether provided from a still photograph or a video sequence, each of the numbers in the array correspond to a digital word (e.g. an eight-bit binary value) typically referred to as a "picture element" or a "pixel" or as "image data." The image may be divided into a two-dimensional array of pixels with each of the pixels represented by a digital word. Color images having only a luminance component (such images are known as gray scale images) may be processed. Thus, a pixel represents a single sample which is located at specific spatial coordinates in the image.

An "object" is an identifiable entity in a scene in a still image or a moving or non-moving entity in a video image. For example, a scene may correspond to an entire image while a house or boat might correspond to an object in the scene. Thus, a scene typically includes many objects and image regions while an object corresponds to a single entity within a scene. An "image region" or more simply a "region" is a portion of an image. For example, if an image is provided as a 32×32 pixel array, a region may correspond to a 4×4 portion of the 32×32 pixel array.

As used herein, sparse may refer to the detection of thinly dispersed salient features. For example, in one embodiment, a sparse search may include identifying only salient features in an image. Semi-dense may refer to identifying regions or points having high-gradient fields (i.e., above a gradient threshold) and thus, ignoring areas having low gradient scores or low texture regions. Dense may refer to providing a value to each pixel in an image. For example, in one embodiment, in a dense computation, every pixel may be provided a value.

Before describing the processing to be performed on images, it should be appreciated that, in an effort to promote clarity, reference is sometimes made herein to one or more "features" or "information" or "regions" of an image.

It should be understood that the features can correspond to any particular characteristic of an object within an image (e.g., a corner or edge of a house or other structure) including its relationship to other features within the same or a different image. Also, regions should be understood as not being limited to any particular type, size or shape of a portion of an image (i.e. the region need not have a square or a rectangular shape).

Accordingly, those of ordinary skill in the art will appreciate that the description and processing taking place on "regions" of an image could equally be taking place on portions of an image having a square, rectangular, triangular, circular, or elliptical shape of any size. Likewise, the particular field in which the image processing systems and techniques of described herein may be used includes but is not limited to vehicle navigation (e.g. including vehicles with or without human drivers).

In some embodiments, a reconstruction may be performed using stereo mapping techniques to extract three-dimensional (3D) information from received images. The 3D information can be extracted by comparing information about the particular scene from at least two spaced apart imaging systems so as to obtain different views of a scene (e.g., left and right views). In some embodiments, comparing the information includes mapping points and/or regions from one camera view to the other camera view. For example, by analyzing the relative positions of different features in both cameras views, 3D information (e.g., depth) can be obtained to properly reconstruct the image and provide accurate depth information.

Now referring to FIG. 1, a tunable stereo reconstruction system 100 includes a stereo reconstruction module 110 which receives one or more images of a scene from respective ones of images sources 102, 104 at an input thereof. Image sources 102, 104, may for example, be provided as one or more cameras (digital or analog), charge coupled devices (CCDs) or any other type of analog or digital imager. In an embodiment, the tunable stereo reconstruction module 110 may, for example, be coupled to one or more cameras disposed on a vehicle (e.g. a self-driving vehicle or an unmanned aerial vehicle) and the system enables the vehicle to accurately and in real-time determine objects and features of interest in a geographic area in which the vehicle is moving.

The cameras (or other imaging devices) may image a scene around the vehicle from at least two vantage points (e.g., two cameras disposed in two distinct positions). The position of each of the individual imaging devices and their positional relationship to each other may be based, at least in part, upon the shape and/or dimensions of a structure (e.g., car) to which the imagers are coupled. As will be described further below in conjunction with FIGS. 2-4H, in an embodiment, using a known geometric relationship between the views of two imagers, information such as depth can be identified from images obtained by the imaging devices.

In response to the stereo reconstruction module 110 receiving the one or more images from each imaging source, stereo reconstruction module 110 identifies points of interest (or more simply, "points") in the images. Such points may correspond to significant or distinguishing features in the images. In the case of images being generated from a car travelling down a street, for example, such features may include, but are not limited to, corners of a road, curb and/or building.

The stereo reconstruction module 110 can determine disparity values for each of the identified points. A disparity value may correspond to a difference between a point in a first image of a scene and the same point in a second, different image of the same scene where the first and second images of the scene are generated from different vantage points with respect to the scene. Thus, the disparity values may correspond to computed differences between a point as viewed from a first vantage point of a scene (e.g. via a first camera) and a point as viewed from a second, different vantage point of the same scene (e.g. via a second, different camera).

For example, the disparity value for a point identified in two images, a left image and a right image, may be defined as the difference between their respective x-coordinate values (e.g., $D=(X_{left}-X_{right}$, where $X_{left}$ represents the x-coordinate value in the left image and $X_{right}$ represents the x-coordinate value in the right image). Thus, in some embodiments, the disparity value represents an offset distance between the same point identified in two images of substantially the same scene but generated from different locations. In one embodiment, a sub-pixel disparity value can be computed to allow for floating point values for the disparity (e.g., not tied to integer disparities). In some embodiments, the sub-pixel disparity value computation may be performed post processing, for example, but without limitation, to verify or otherwise check an accuracy of the reconstruction of an image.

The stereo reconstruction module 110 generates a piecewise planar mesh based upon the identified points and their respective disparity values. An example of such a piecewise planar mesh is illustrated in detail in conjunction with FIG. 4. In one embodiment, the piece-wise planar mesh may be provided from a plurality of geometric regions (e.g. regions having a geometric shape) formed by connecting ones of the identified points. Each of the geometric regions may define one or more candidate planes (i.e. one or more planar surfaces). In an embodiment, geometric regions may be provided as triangular regions and the piece-wise planar mesh may be provided from a tessellation of such triangular regions (and thus, a tessellation of candidate planes).

It should, however, be appreciated that in embodiments, the piece-wise planar mesh may be provided from a variety of different geometric shapes. In embodiments, geometric shapes may be used in a Tessellation to form the piece-wise planar mesh. In embodiments, a single piece-wise planar mesh may be provided from a plurality of different geometric shapes. Regardless of the manner in which the piece-wise planar mesh and candidate planes are formed, plane parameters may be determined for each of the candidate planes.

The stereo reconstruction module 110 provides the piece-wise planar mesh to a disparity module 120. In response to the information provided thereto, the disparity module 120 performs a disparity interpolation on candidate planes using the plane parameters to determine depth information for the identified points. In an embodiment, the disparity module 120 can generate a disparity image having a plurality of regions based on the disparity interpolation.

A cost module 130 receives the disparity image from the disparity module 120. Cost module 130 can compute or otherwise determine cost values for mesh regions of an image using disparity values associated with points and/or pixels in the image. The cost values may be a representation or indication of an accuracy with respect to how well points in a first image were mapped to points in a second image. Computation of cost values is described below in conjunction with FIG. 3.

In embodiments, the cost module 130 compares the cost value for each of the plurality of mesh regions to a cost threshold. Those mesh regions having a cost value that is less than the cost threshold may be validated, thus indicating the points in the respective region were correctly mapped.

Those mesh regions having a cost value greater than or equal to the cost threshold may be invalidated, thus indicating the points in the respective mesh regions were incorrectly mapped. The invalidated regions may then be marked for re-sampling.

A resampling module 140 receives the invalidated regions from the cost module 130. The resampling module 140 can mark the invalidated regions for re-evaluation. In some embodiments, the resampling module 140 can determine a grid size of the invalidated region. Using the grid size, the resampling module 140 can divide the invalidated region into two or more smaller regions, thus reducing the grid size and generating multiple new regions to be re-sampled.

The resampling module 140 may transmit the newly formed regions for resampling to the stereo reconstruction module 110 thus providing a feedback mechanism to continually and iteratively re-evaluate regions of an image until each of the regions have been validated and the original scene has been reconstructed. Once each of the regions have been validated or a predetermined number of regions have been validated, the resampling module 140 may generate an output 150 representing a reconstruction of the original images received.

Tunable stereo reconstruction system 100 may be considered a tunable system as various parameters and/or thresholds utilized during the reconstruction process can be modified or otherwise tuned to provide a tunable system and process. The tunable parameters may include, but not limited to, disparity values (or disparity thresholds), gradient values (or gradient thresholds), cost values (or cost thresholds, and/or accuracy values (or accuracy thresholds). That is, by changing one or more of these values and/or thresholds to either increase a resolution of a final reconstructed image and/or increase a computation speed of the tunable and iterative stereo mapping technique, an iterative stereo disparity hypothesis and refinement technique is provided that offers tunable iteration parameters to adjust the accuracy-versus-speed trade-off requirement in real-time. Thus, the tunable stereo reconstruction system 100 can perform multiple iterations until an image is reconstructed with an appropriate resolution utilizing the tunable parameters and/or thresholds.

Figure 2:
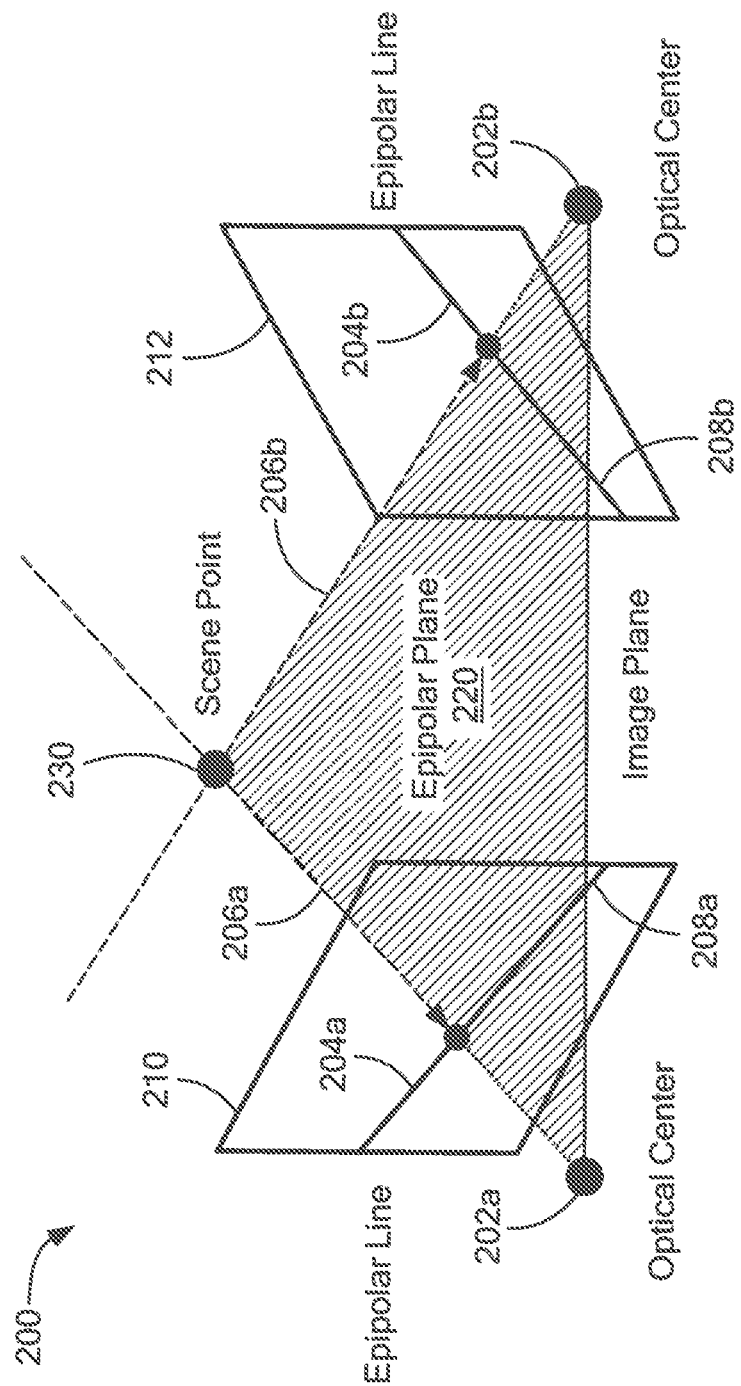
FIG. 2 is a diagram of an epipolar geometric relationship between a left view and right view of a scene point.

Referring now to FIG. 2, a diagram of an epipolar geometry of a scene 200 that includes a scene point 230 viewed from at least two imaging devices (not explicitly shown in FIG. 2 for clarity) having imaging planes 210, 212 is provided. Imaging devices may be the same as or similar to imaging devices 102, 104 (e.g. cameras) described above in conjunction with FIG. 1. The scene 200 may, for example, be of or include a roadway on which a vehicle is traveling, as well as any moving and/or non-moving features around the roadway (e.g. environmental features including, but not limited to, static infrastructure such as guardrails, curbs, turns or curves in a road, houses, trees, parked vehicles, moving infrastructure such as other vehicles, bikes, persons, etc.).

The vehicle or object to which an image reconstruction system is coupled may need to reconstruct scene 200 in real-time to allow the vehicle to navigate (e.g. drive on a roadway or fly in a desired region or route) or otherwise move in a desired manner.

The imaging devices may capture an image or a single representative frame of a video of scene 200 in which contents and associated relationships among the scene contents (e.g. objects and features of interest in a geographic area in which the vehicle is moving) within the image can be determined and assigned a semantic meaning. For example, cameras having imaging planes 210, 212 may capture a still image or a video image having moving and/or non-moving entities. The scene 200 may include a so-called "scene point" 230, a plurality of scene points 230 and/or a plurality of regions to be analyzed.

The scene point 230 may correspond to a point (e.g. as defined by one or more pixels) in an image of the scene 200 captured by the two cameras. For example, in some embodiments, a scene point 230 may correspond to a feature (e.g., edge) of a curb, house or tree in scene 200. It should be appreciated that while the following description of FIG. 2 is based upon a single scene point 230, the same geometric relationships and descriptions below may apply to each of a plurality of scene points 230.

In the example embodiment of FIG. 2, a pair of imaging devices having imaging planes 210, 212 disposed at different vantage points (e.g., a "left" camera and a "right" camera) image a three-dimensional (3D) scene 200. In an embodiment, when a 3D scene is imaged from at least two imaging devices having optical centers 202a, 202b and imaging planes 210, 212 (i.e., the imaging devices are disposed at two distinct positions, a number of geometric relations between points in the scene 200 (e.g., scene point 230) and their projections 206a, 206b onto a two-dimensional (2D) plane can be determined to identify constraints (e.g., epipolar constraints as will be described below) between scene points 230 of the left and right imaging devices respectively. Further, information relating to the scene point 230 can be determined using the constraints.

For example, knowing a position of a pair of cameras having imaging planes 210, 212 and their respective views along known projection lines 206a, 206b, information, such as depth, can be determined for the scene point 230 or a plurality of scene points 230 in view of both the left and right cameras. In one embodiment, scene points 230 from views of both cameras can be compared to determine properties of various features in the scene point 230.

To determine information about the scene point 230, the geometric relationship between the views of the left and right cameras can be analyzed. In an embodiment, the imaging plane of left camera 210 may have an epipolar line 204a and the imaging plane of right camera 212 may have an epipolar line 204b. The location of epipolar lines 204a, 204b on the respective imaging planes 201, 212 are a function of a position of a point (e.g., scene point 230) in 3D space. As the point varies, a set of epipolar lines can be generated on each imaging plane 210, 212.

In the example of FIG. 2, each of the imaging devices has an optical center 202a, 202b, respectively. The optical centers 202a, 202b are distinct from each other, and each center 202a, 202b may be projected onto a distinct point (referred to as an "image point" and here identified with reference numerals 208a, 208b) into the other cameras image plane 210, 212. The image point 208a, 208b for a respective camera may also be referred to as an epipole or an epipolar point. As illustrated in FIG. 2, image points 208a, 208b fall along respective ones of epipolar lines 204a, 204b in image planes 201, 212 (i.e., image point 208a for the first imaging device lies along the first epipolar line 204a and image point 208b for the second imaging device lies along the second epipolar line 204b).

Each of the optical centers 202a, 202b is aligned with a respective one of projection lines 206a, 206b. The left projection line 206a may be seen from the left imaging device (e.g., though imaging plane 210) simply as a single point, here the scene point 230. However, from the right imaging device (e.g., though imaging plane 212), left projection line 206a may appear as a line it its respective image plane. In an embodiment, from the right imaging device (e.g., through imaging plane 212), the left projection line 206a may be seen as the right view epipolar line 204b. The right projection line 206b may be seen from the right imaging device (e.g., through imaging plane 212) simply as a single point, here the scene point 230. However, from the left imaging device (e.g., through imaging plane 210), right projection line 206b may appear as a line it its respective image plane. In an embodiment, from the left imaging device (e.g., through imaging plane 210), the right projection line 206b may be seen as the left view epipolar line 204a.

If the position of imaging devices (and thus imaging planes 210, 212) is known, the properties of the 3D scene 200 and the scene point 230 in the scene 200 being imaged or viewed by the two imaging devices can be determined. For example, if the position of a left camera is known and the left projection line 206a is known (where the camera is pointed), the right epipolar line 204b can be determined because it corresponds to the left projection line 206a, which is known. In an embodiment, symmetrically, the right epipolar line 204b may be parallel to the left projection line 206a. Thus, if the scene point 230 lies in left projection line 206a, scene point 230 lies in right epipolar line 204b from the point of view of the right camera 212. Similarly, if the position of the right camera 212 is known and the right projection line 206b is known (where the camera is pointed), the left epipolar line 204a can be determined because it corresponds to the right projection line 206b, which is known. In an embodiment, symmetrically, the left epipolar line 204a may be parallel to the right projection lines 206b. Thus, if the scene point 230 lies in right projection line 206b, scene point 230 lies in left epipolar line 204a from the point of view of the left camera 210.

The scene point 230, as viewed from the left camera 210, is least one point on the left epipolar line 204a and, as viewed from the right camera 212, scene point 230 is least one point on the right epipolar line 204b. Thus, for each point observed in one image, the same point must be observed in the other image on the known epipolar line. This may be referred to as the epipolar constraint, as the position of scene point 230 is constrained to lie on the respective epipolar lines.

Each point along a projection line 206a, 206b that is not the scene point 230 can be used to verify the epipolar constraint as they establish an epipolar plane 220 between the views of the left and right cameras 210, 212. In some embodiments, the points along the projection lines 206a, 206b may be referred to as support points.

The projection lines 206a, 206b can be used to perform an epipolar search. For example, given a point in one image, an epipolar search can be performed along the projections lines 206a, 206b to identify the corresponding point in the other image. Thus, instead of searching an entire 3D image for a corresponding point, the epipolar search is constrained to a 1D line, a respective projection line 206a, 206b. Having mapped the image points from a left imaging device to image points from the right imaging device, reconstruction of the scene point 230 can be performed.

Figure 3:
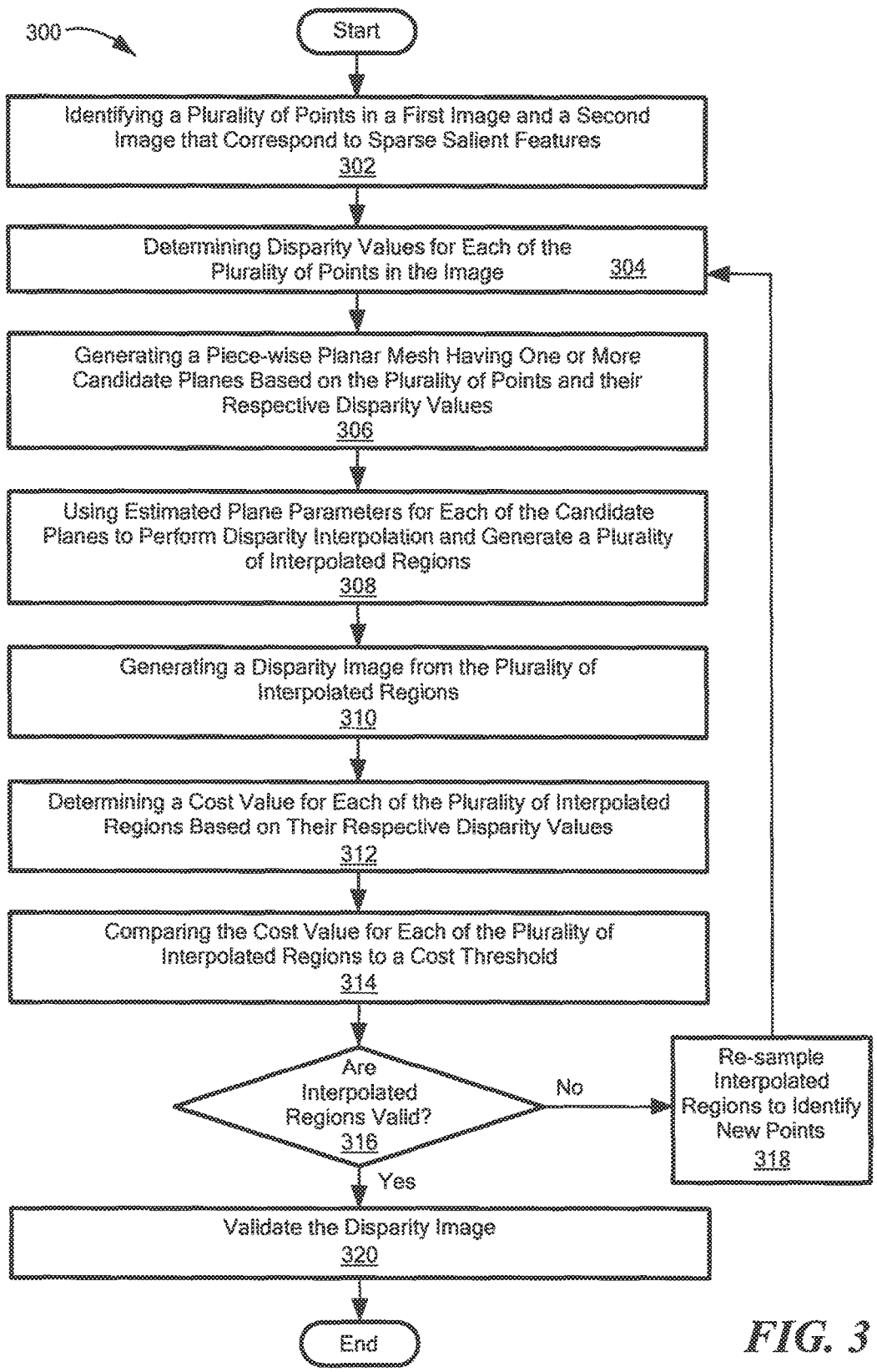
FIG. 3 is a flow diagram of a method for performing tunable scene reconstruction.

FIG. 3 is a flow diagram showing illustrative processing that can be implemented within the tunable stereo reconstruction system 100 (FIG. 1). Rectangular elements (typified by element 302 in FIG. 3), denoted as "processing blocks," represent computer software instructions or groups of instructions. Diamond shaped elements (typified by element 316 in FIG. 3), denoted as "decision blocks," represent computer software instructions, or groups of instructions, which affect the execution of the computer software instructions represented by the processing blocks. Alternatively, the processing and decision blocks may represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated, the particular sequence of blocks described is illustrative only and can be varied without departing from the spirit of the concepts, structures, and techniques described. Thus, unless otherwise stated the blocks described below are unordered meaning that, when possible, the functions represented by the blocks can be performed in any convenient or desirable order.

Turning now to FIG. 3, a method 300 for reconstructing an image begins at block 302, where a plurality of points in a first image and a second image can be identified. The points can correspond to sparse salient features in the respective image. Salient features may include features, image gradients, and/or characteristics of objects, shapes, scenery and/or people in the image. For example, in one embodiment, a point may be identified at each edge or border of a building in the image. Thus, in some embodiments, the points identified in the image may correspond to pixels or areas having a different depth value and/or different gradient value (e.g., greater, less than) than other pixels or regions in the image.

The first and second image may be images of the same scene, however the first image may be taken from a first vantage point and the second image may be captured from a second vantage point. For example, a scene may be captured from both a left view and a right view. The left view may refer to the first image and the right view may refer to the second image. In an embodiment, points can be identified in both the left and right views and a similarity between the points in each view can be determined in order to determine corresponding pixels in each view.

In some embodiments, a predetermined number of points may be identified for each image. For example, a predetermined number of points may be identified in each image processed. In other embodiments, the number of points may be unique to a particular image and the number of features, image gradients, and/or characteristics of objects, shapes, scenery and/or people in the image. For example, in one embodiment, number of points may correspond to sparse yet salient and/or characteristic features and thus be extracted from the image.

At block 304, disparity values may be determined for each of the plurality of points identified in the first and second image. In an embodiment, a disparity value refers to a difference between a point in the first image and the corresponding point in the second image. For example, in some embodiments, the disparity value may refer to an offset distance between two corresponding points in a left and right view of the same scene point if the two views were superimposed onto each other (e.g., the left and right image of a stereo pair).

One or more points in the first image may be mapped to one or more points in the second image using the respective epipolar line of the camera that took the respective image. For example, for each point identified in the first image, a corresponding point or multiple points can be identified in the second image using the respective epipolar line. In some embodiments, the disparity values can be determined by matching regions from the first image to regions in the second image using epipolar lines.

In an embodiment, instead of searching an entire 3D space imaged by the respective camera, the search for corresponding points can be reduced to a 1D search along the respective epipolar line. Thus, the points in the first image may be mapped to points in the second image using an epipolar search. In an embodiment, for each point observed in one image, the same point can be observed in the other image using the respective epipolar lines. Thus, the epipolar search can search long the epipolar line to identify the corresponding point or points in the other image.

For each of the points identified in the image, a disparity value may be determined between points in the first image and their corresponding points in the second image. As indicated above, the second image may simply refer to another view of the same scene captured in the first image (e.g., a left or right view of the image). Thus, having identified corresponding points between the first image and the second image, a disparity value may be determined to determine how closely related the identified corresponding points are. For example, a point having a disparity value greater than a predetermined value may indicate an incorrectly mapped point. If the points are correctly mapped, the disparity values may be less than the predetermined threshold.

A set of support points may be determined for the plurality of points in the image. In an embodiment, support points may refer to a concatenation (e.g., intersection) of the respective image coordinates of a point in the first image to the corresponding point in the second image. For example, the support points may refer to points along a projection line from one cameras view that intersects with a point in the second cameras view. A concatenation value may be determined for each of the support points indicating the coordinates of the intersection point. For example, a set (S) of support points may be defined as $S=\{S_1, \ldots, S_n\}$. The support points may be mapped along their respective epipolar lines and each support point can be defined as $S_n=(u_n, v_n, d_n)^T$, where, u, v and d represent 3D coordinates, as the concatenation of their image coordinates $(u_n, v_n) \in N^2$, and their corresponding disparity $d_n \in N$.

At block 306, a piece-wise planar mesh having a plurality of candidate planes may be generated based on the plurality of points and their respective disparity values. In some embodiments, the piece-wise mesh may be formed using Delaunay triangulation. It should be appreciated that any triangulation technique may be used and the particular triangulation technique used can depend on the particular application. The candidate planes (also referred to as planar surfaces herein) may refer to planar surfaces having a depth value associated with them. For example, in one embodiment, the candidate planes may be defined by two-dimensional coordinates (e.g., x, y coordinates) as well as depth measurements. The support points may be used as vertices and to establish boundaries for each of the candidate planes.

In some embodiments, the piece-wise planar mesh may be a tessellation connecting the plurality of points identified in the image. The tessellation may connect each of the identified points in the image using various geometric shapes such that no shape overlaps into the area of another shape. For example, in a Delaunay triangulation, a set of points may be interconnected using triangular regions such that that no point in the set of points is inside the circumcircle of any triangular region. In some embodiments, the Delaunay triangulations may maximize the minimum angle of all the angles of the triangles in the triangulation.

In some embodiments, the candidate planes may include 3D triangular regions formed during the Delaunay triangulation. The 3D triangular regions may represent the image reconstruction using the mapped points between the first image and the second image. The candidate planes may provide a measure (e.g., depth) of an underlying surface from the original image.

In an embodiment, 3D parameters can be identified for each of the candidate planes (e.g., triangular regions) in the piece-wise planar mesh. The 3D parameters may include plane coefficients for each pixel in a respective candidate plane. For example, each candidate planes can be described by its 3D plane parameters. For each plane, π, the plane parameters can be represented by the corresponding quadruple $(\pi_1, \pi_2, \pi_3, \pi_4)$ of partitions of the respective plane. Thus, the plane parameters can be represented as $(\pi_1, \pi_2, \pi_3, \pi_4) \in R^4$ given by $\pi_1 X + \pi_2 Y + \pi_3 Z + \pi_4 = 0$, where $R^4$ represents the set of quadruple numbers in real form, here the coordinates (x, y, z) of a plane representing candidate planes.

For a stereo reconstruction system with a known baseline B, and known calibration (u=f X/Z, v=fY/Z, and d=f B/Z), the above equation reduces to $\pi'_1 X + \pi'_2 Y + \pi'_3 Z + \pi'_4 = d$. Where $\pi' = (\pi'_1, \pi'_2, \pi'_3) \in R^3$ are the plane parameters in disparity space. The baseline, B, may represent the known distance between a position of a first imaging device and a second imaging device (e.g., baseline between a left and right camera) and f represents a focal length. In some embodiments, the values for B and f can be obtained using known camera calibration techniques and can be considered constants. The equations for u, v, and d can be obtained using known or standard camera equations.

In an embodiment, π' may represent the plane parameters for each triangular region formed during the Delaunay triangulation. For example, in one embodiment, using $$X = \frac{uZ}{f}, Y = \frac{vZ}{f} \text{ and } Z = \frac{fB}{d},$$

$$\text{produces } \pi 1\left(\frac{uZ}{f}\right) + \pi 2\left(\frac{vZ}{f}\right) + \pi 3\left(\frac{fB}{d}\right) + \pi 4 = 0.$$

Then, using $$\frac{Z}{f} = \frac{B}{d}, \text{ produces } \pi 1\left(u\frac{B}{d}\right) + \pi 2\left(V\frac{B}{d}\right) + \pi 3\left(\frac{fB}{d}\right) = -\pi 4.$$

Multiplying by $$-\frac{d}{\pi 4}, \text{ produces } -\frac{\pi 1}{\pi 4}uB - \frac{\pi 2}{\pi 4}vB - \frac{\pi 3}{\pi 4}fB = d.$$

Finally, reducing constants f, B, produces $\pi'1u + \pi'2v + \pi'3 = d$.

At block 308, disparity interpolation may be performed on the plurality of candidate planes using the estimated plane parameters for each of the plurality of candidate planes to generate interpolated regions. In an embodiment, to perform disparity interpolation on each of the candidate planes, a look-up table may be generated for each of the candidate planes. The look-up table may include the 3D parameters for each of the candidate planes. For example, in order to estimate interpolated disparities on a pixel-level basis, the lookup-table may identify the respective candidate planes and its plane coefficients for each pixel (u, v) in the first image (e.g., left image). The disparity interpolation can be performed to determine the plane parameters for each triangular region in disparity space. Disparity space may refer to a representation (e.g., disparity space image) of the differences (i.e., disparities) of points in one image as compared to a second image. In an embodiment, π' may represent the plane parameters for each triangular region in disparity space. The plane parameters for each triangular region in disparity space may include depth values associated with pixels in each the respective triangular region.

The parameters π' for each candidate plane can be stored in the look-up table. In some embodiments, the parameters π' for each candidate plane can be re-estimated every time after the Delaunay triangulation step for each iteration of method 300. The resulting piece-wise planar tessellation can be used to linearly interpolate regions within the piece-wise planar mesh using the estimated plane parameters π'. The interpolated regions may refer to the candidate plane represented in disparity space.

At block 310, a disparity image may be generated from the interpolated regions. In some embodiments, one or more of the interpolated regions may be of different size. For example, a regions size may be based at least in part on the features in the respective interpolated region. In other embodiments, the plurality of interpolated regions may be a predetermined size.

In an embodiment, each of the plurality of interpolated regions may include interpolated disparity values for one or more of the plurality of points in a respective interpolated region. The disparity image may include depth values for each of the plurality of regions. In an embodiment, a disparity image may be generated after each tessellation of the respective images.

At block 312, a cost value may be determined for each of the plurality of interpolated regions based on their respective disparity values. In an embodiment, to validate the interpolated disparities and determine the cost value for each of the interpolated regions, a Census window-based mapping between related interpolated regions in the first and second image may be performed. The Census window-based mapping may provide the cost value indicating a disparity between the first and second image. The cost value may correspond to a disparity between an interpolated region in the first and a corresponding interpolated region in the second image. For example, the cost value (e.g., census cost) can be computed over the intensity values of the first and second image. The disparity value corresponding to the lowest consensus cost can be selected to be the true disparity.

In some embodiments, the cost value may be based upon a per-pixel cost computed by determining the disparities between the first and second image for each pixel in the respective interpolated region. The consensus cost can be computed on a 1×1 pixel patch basis or on a larger patch basis. In some embodiments, the consensus cost can be computed on a 5×5 pixel patch basis. The pixel patch basis can be selected based on the requirements of a particular application of the reconstruction. A cost value may represent an average of the disparities for each pixel in the respective interpolated region.

At block 314, the cost value for each of the plurality of interpolated regions may be compared to a cost threshold. The cost threshold may indicate an accuracy of the respective interpolated region in the disparity image. In some embodiments, the cost threshold can be modified to create a tunable reconstruction system. For example, the cost threshold can be increased to increase a computation speed of method 300. In other embodiments, the cost threshold can be decreased to reconstruct images with greater resolution.

In an embodiment, the interpolated disparities computed from the tessellation may or may not necessarily hold true for all pixels in the image. Thus, the image can be divided into regions and for high-gradient regions in the image, the cost value computed between the first and second image (e.g., left and right stereo patch) for the given interpolated disparity can be a sufficiently good indication to validate the candidate pixel disparity for the respective region.

The cost value may be based upon the disparities determined on a per-pixel basis for each pixel in a respective interpolated region. Thus, for each interpolated region, we can invalidate every pixel p in the left image, if the cost associated c (p, p-$d_i$) with mapping the pixel, p-$d_i$, in the right image with a given interpolated disparity $d_i$ is above the cost threshold ($t_{th}$). The same approach can be used to validate pixels that fall within an acceptable cost range and below the cost threshold (<$t_{th}$).

At block 316, a determination may be made as to whether the interpolated regions are valid. In an embodiment, if the cost value for a region is less than the cost threshold, than this may indicate an accurate region. An accurate region refers to a region having correctly mapped points between the first image and their corresponding points in the second image. Thus, regions may be validated when their respective cost value is less than the cost threshold.

Alternatively, a region having a cost value that is greater than or equal to the cost threshold may indicate that is an inaccurate region. An inaccurate region refers to regions having points in the first image that were incorrectly mapped to their corresponding points in the second image. In an embodiment, the regions may be invalidated when their cost value is greater than or equal to the cost threshold. In some embodiments, the invalidated regions may include occluding edges and sharp discontinuities in depth that can cause a high cost value 9 i.e., greater than the cost threshold). For example, the occluding edges and sharp discontinuities in depth in the image can make it harder to correctly map points from first image to the second image. Thus, these invalidated regions may need further evaluation to correctly map the points and reconstruct the original image.

At block 318, validated and/or invalidated regions may be re-sampled and re-evaluated to determine new corresponding points between the points in the first image and the second image within the respective region. Thus, method 300 may return to block 304 to determine new disparity values for the plurality of points in the image. The points in the validated and/or invalidated regions can be re-sampled and densely mapped using an epipolar search. For example, new support points may be determined for the new points and can be used in the epipolar search.

In some embodiments, for subsequent iterations, the validated and/or invalidated regions can be divided into two or more smaller regions as part of a disparity refinement process. The validated and/or invalidated regions include points (e.g., pixels in the image) whose disparities need to be re-sampled and re-evaluated. Thus, the validated and/or invalidated regions may be resized and divided into two or more smaller regions.

In some embodiments, a grid size can be determined for each of the regions based on the respective cost value of the regions. The grid size may indicate the number of pixels in the respective region (e.g., 5×5 grid). In an embodiment, the grid size may be reduced for one or more the plurality of regions on each subsequent iteration. For example, the regions to be resampled may have their grid size reduced for the next iteration and for re-sampling. In some embodiments, to reduce the grid size, the respective region may be divided into two or more regions. Thus, the new smaller regions can be re-sampled. New points may be identified in the smaller regions and new disparity values may be determined for the new points.

In some embodiments, each iteration of method 300 may provide disparities at greater resolution and accuracy with every subsequent iteration. For example, as the grid size of the invalidated regions is reduced with each subsequent iteration, the points (e.g., pixels in the image) can be more densely sampled with every successive iteration.

During the resampling of the invalidated regions, a plurality of points may be identified in a first region of the first image that has been previously invalidated. Disparity values may be determined for each of the plurality of points in a first region and a piece-wise planar mesh may be generated based on the plurality of points and their respective disparity values through Delaunay triangulation. The piece-wise planar mesh may include a plurality of candidate planes (e.g., triangular regions).

In an embodiment, disparity interpolation may be performed on the plurality of candidate planes using the estimated plane parameters for each of the plurality of candidate planes and a disparity image may be generated having a plurality of sub-regions in the first region based on the disparity interpolation. In an embodiment, a cost value may be determined for each of the plurality of sub-regions based on their respective disparity values and comparing the cost value for each of the plurality of sub-regions to a cost threshold. In an embodiment, method 300 may continue resampling invalidated regions until there are no invalidated regions. Thus, method 300 is an iterative process to correctly map points from a left view of an image to points in a right view of the same image.

At block 320, once all or a predetermined number of regions of the disparity image have been indicated as valid, the method 300 may provide a completed disparity image as a final output. The disparity image may be a 3D reconstruction of the images originally provided. The image may disparity image may include accurate depth information to properly inform a user of the features of an environment around them.

In an embodiment, the stereo mapping provided herein can reduce the overall stereo mapping cost associated with the interpolated piece-wise planar disparity map. For example, high-mapping cost regions are re-sampled and re-evaluated to better fit the piece-wise planar disparity map to the true scene disparity of the original image. Thus, with every subsequent iteration, new points are sampled and tessellated to inform a piece-wise planar depth prior, and further evaluated to reduce the overall mapping cost of the image.

In an embodiment, with such an iterative procedure, the overall stereo mapping cost can be reduced, with the obvious cost of added computation or run-time requirement. For example, method 300 is tunable as the cost threshold can be adjusted to achieve greater accuracy or alternatively, reduced to achieve a faster computation time. In some embodiments, the cost threshold can be modified after each iteration. In other embodiments, the cost threshold may be kept at a constant level until the image is accurately reconstructed.

Figure 4:
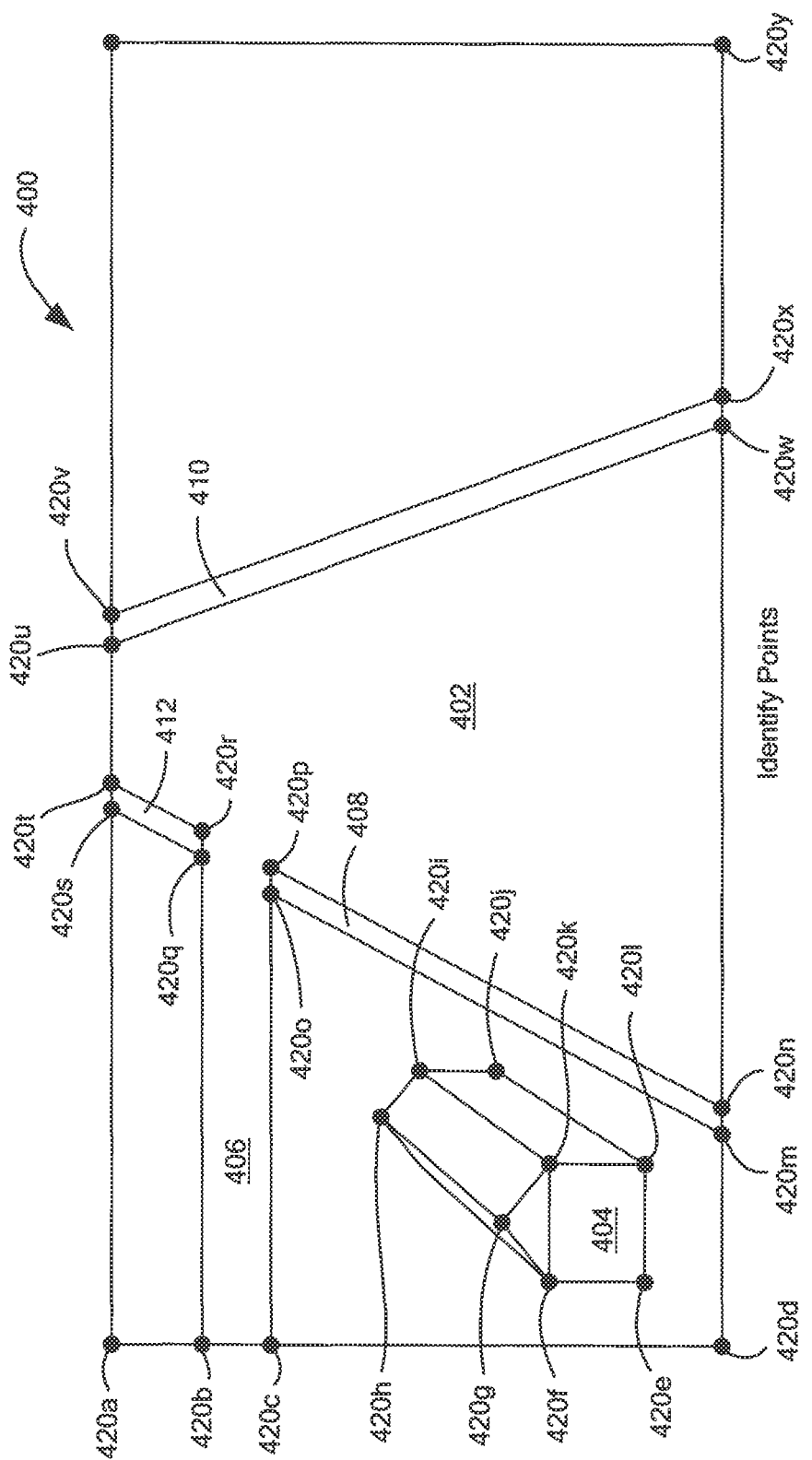
FIGS. 4-4H are illustrative embodiments of a method for performing tunable scene reconstruction.
Figure 4A:
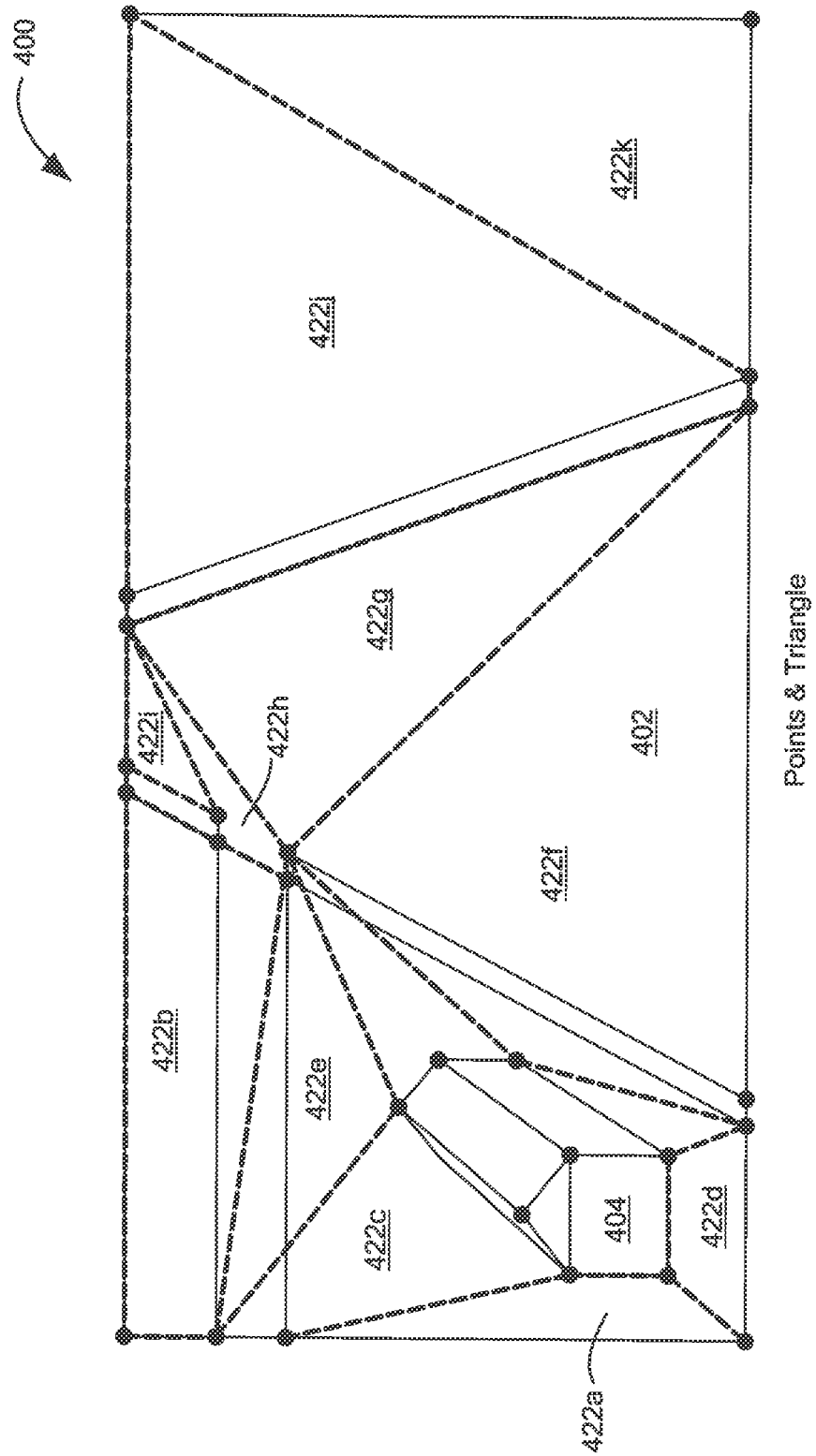
Figure 4B:
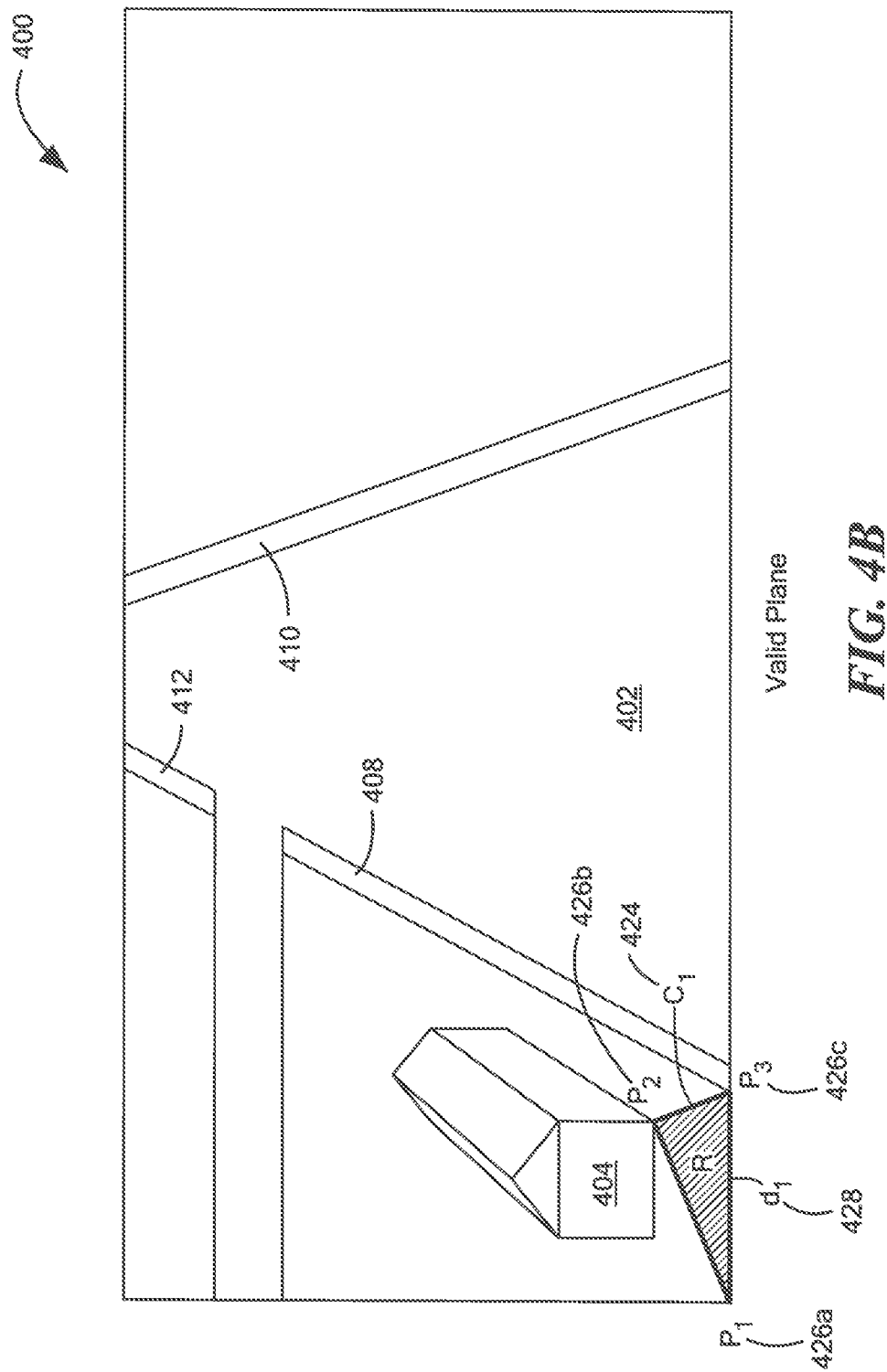
Figure 4C:
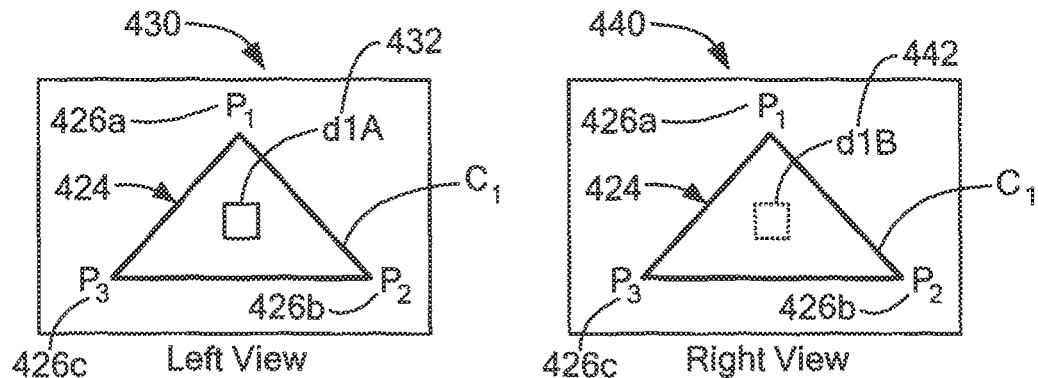
Figure 4D:
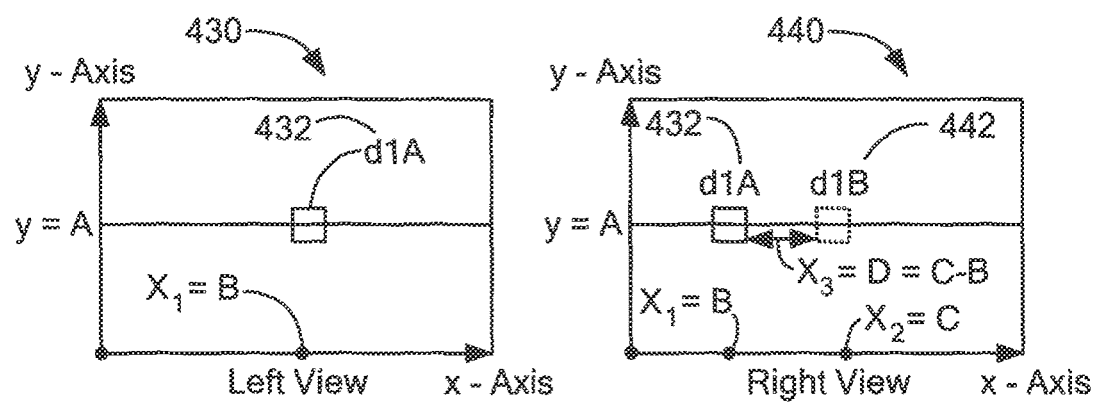
Figure 4E:
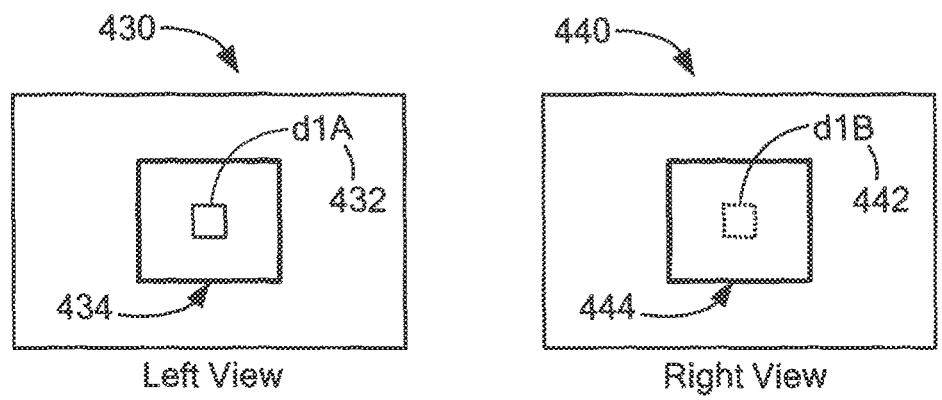
Figure 4G:
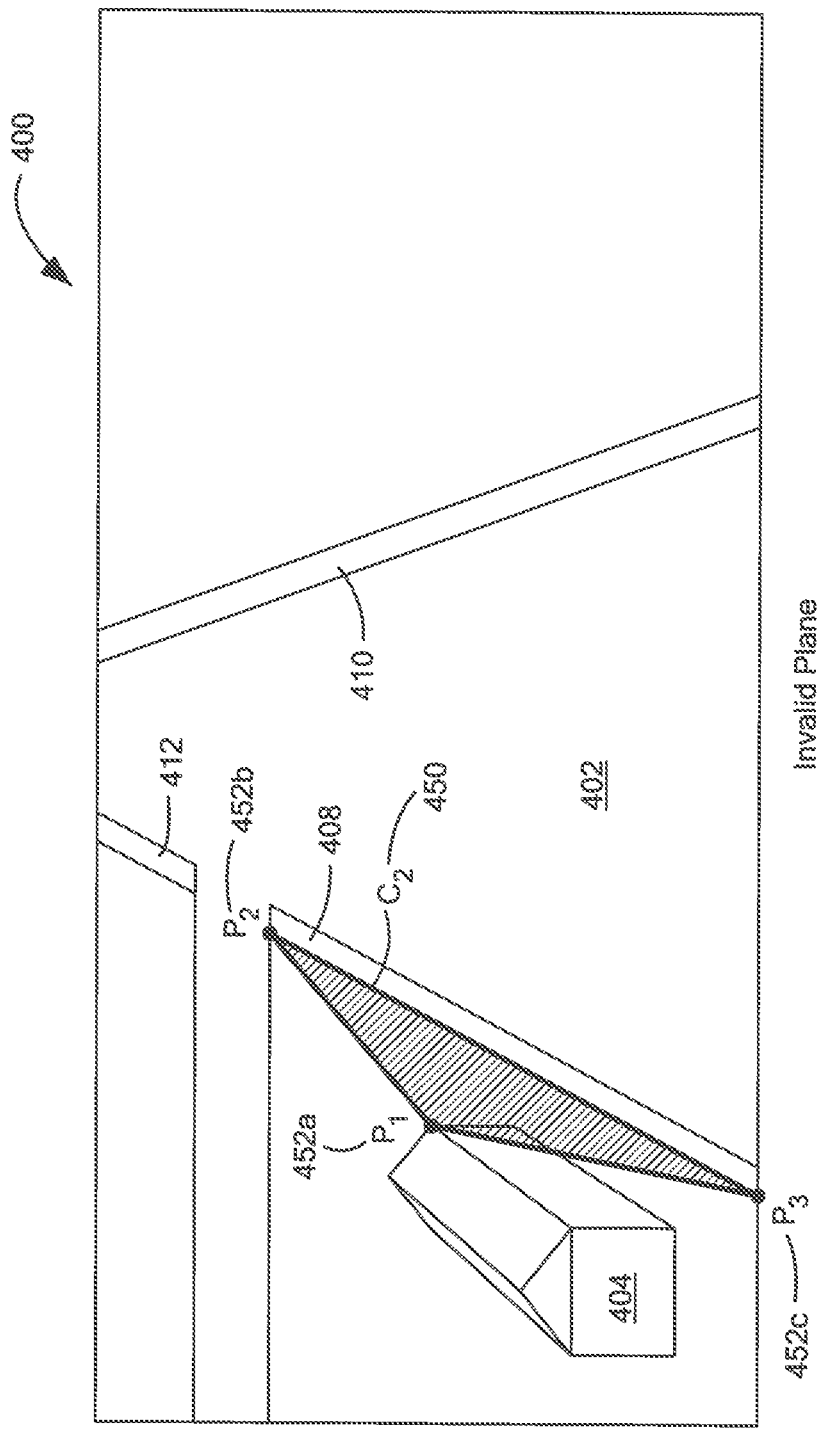
Figure 4H:
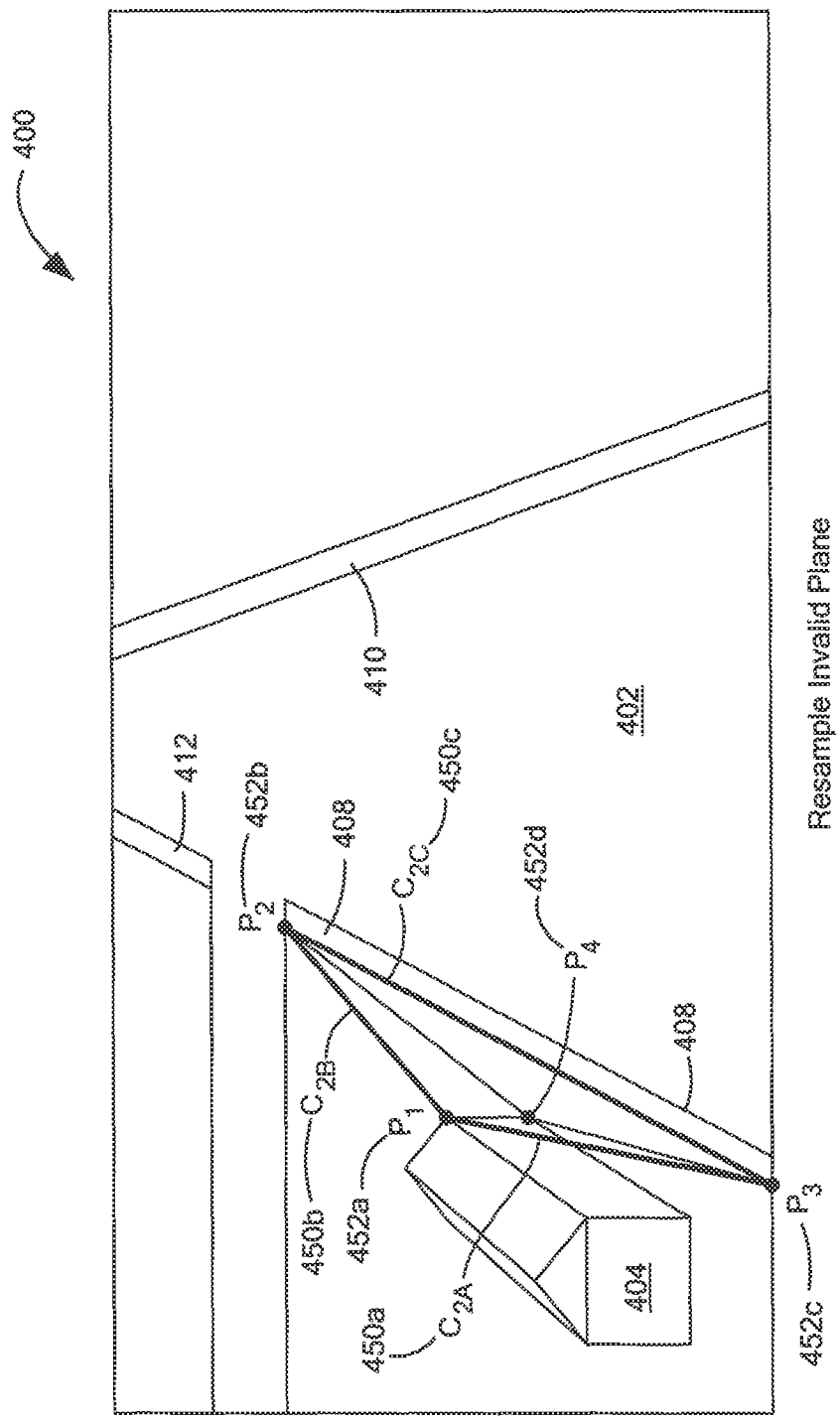

Now referring to FIGS. 4-4H, in which like reference numerals indicate like elements, illustrative embodiments of the methods and techniques described herein are provided. For example, and as illustrated in FIG. 4, a scene 400 includes a main street 402, house 404, a side street 406 and several curbs 408, 410, 412. In one embodiment, scene 400 may represent a viewpoint from a vehicle (now shown), such as but not limited to a self-driving vehicle, driving along main street 402. Thus, the vehicle may actively image scene 400 in order to navigate down main street 402 using image reconstruction.

The vehicle may include one or more cameras and a tunable reconstruction system (e.g., tunable reconstruction system 100 of FIG. 1) to reconstruct scene 400 as the vehicle navigates along main street 402. During image reconstructions, a plurality of points 420a-420z may be identified in scene 400. The points 420a-420z may correspond to objects, shapes or areas having an image gradient above a predetermined gradient threshold, such as sparse salient features. In the illustrative embodiment of FIG. 4, points 420a-420z generally correspond to borders of curbs 408, 410, 412 and house 404. Further, although twenty-six points are identified in scene 400, it should be appreciated that any number of points may be identified in a scene (e.g., single point, multiple points). The number of points identified may vary and may be unique to a particular scene or image and the number of features, image gradients, and/or characteristics of objects, shapes, scenery and/or people in the scene or image.

Referring now to FIG. 4A, a plurality of candidate planes 422a-422k can be identified using points 420a-420z. The geometric shapes and dimensions of candidate planes 422a-422k can vary based at least in part on the positions of the different points 420a-420z and/or the characteristics of scene 400. Further, although eleven candidate planes are formed in scene 400, it should be appreciated that any number of candidate planes may be formed based at least in part on the number of points 420a-420z, a desired accuracy of the reconstruction and the characteristics of objects, shapes, scenery and/or people in the scene or image. In an embodiment, candidate planes 420a-420z can be used to generate a piece-wise planar mesh corresponding to scene 400.

Referring now to FIG. 4B, a candidate plane 424 is formed using a first point 426a, a second point 426b and a third point 426c. Candidate plane 424 may be the same as or substantially similar to candidate planes 422a-422z and points 426a, 426b, 426c may be the same as or substantially similar to points 420a-420z. In an embodiment, candidate plane 424 can be validated using method 300 described above with respect to FIG. 3.

As indicated above, candidate plane 424 can be imaged from at least two cameras providing a left and right view. For example, and referring to FIG. 4C, a left view 430 of candidate plane 424 having a first data point 432 and a right view 440 of candidate plane 424 having a second data point 442 are illustrated. Left view 430 and right view 440 may capture candidate plane 424 from different viewpoints (e.g., locations on a vehicle) and thus one or more corresponding points in both views may be offset from each other. First data point 432 and second data point 442 may correspond to the same point in candidate plane 424, however, if left view 430 was superimposed on right view 440, first and second data points 432, 442 would not line up directly with one another due to the offset.

Referring now to FIG. 4D, left view 430 and right view 440 are illustrated having a coordinate gird in which the horizontal axis represented by the x-axis and the vertical axis represented by the y-axis. In left view 430, first data point 432 is located at a point (B, A). In right view 440, second data point 442 is located at a point (C, A). Thus, first and second data points are positioned at the same height along the vertical axis, but offset by a distance $X_3$ along the horizontal axis. It should be appreciated that first data point 432 is also included in right view 440 to further illustrate this offset difference of the data point imaged from two different viewpoints. In an embodiment, this offset corresponds to a disparity value between the left view 430 and the right view 440.

Although FIGS. 4C-4E illustrate the disparity for one data point, it should be appreciated that a disparity value can be determined for a single data point (or pixel), multiple data points (or pixels) in a candidate plane or each data point (or pixel) in a candidate plane.

In some embodiments, and briefly referring to FIG. 4E, a candidate plane 424 may divided into multiple grids having the same or varying dimensions to determine disparity values and cost values for candidate plane 424. In the illustrative embodiment of FIG. 4E, a first grid 434 includes first data point 432 and a second grid 444 includes second data point 442. A cost value can be determined for first and second grids 434, 444 using the disparity value identified between first data point 432 and second data point 442.

In some embodiments, the cost value may be based upon a per-pixel cost computed by determining the disparities between first grid 434 and second grid 444 for one or more points (or pixels) in candidate plane 424. In some embodiments, the cost value may represent an average of the disparities for each data point in first and second grids 434, 444.

The cost value can be compared to a cost threshold to determine an accuracy of candidate plane 424 and thus validate or invalidate candidate plane 424. If the cost value between first grid 434 and second grid 444 falls within an acceptable cost range and/or is less than the cost threshold ($<t_{th}$), candidate plane 424 can be validated. A valid candidate plane may refer to a region of scene 400 having correctly mapped points between in first grid 434 and their corresponding points in second grid 444. Thus, regions may be validated when their respective cost value is less than the cost threshold. In some embodiments, valid candidate planes can be resampled for a variety of different reasons, including but not limited to, to improve an accuracy of the image reconstruction of scene 400.

Referring now to FIG. 4F, valid candidate plane 424 is re-sampled by identifying additional points in the image, here a fourth point 426d and diving candidate plane into a first candidate plane 424a and a second candidate plane 424b. Similar techniques as described above for FIGS. 4-4E, can be used to validate first candidate plane 424a and a second candidate plane 424b.

Although, FIG. 4F illustrates candidate plane 424 being divided into two smaller regions, it should be appreciated that during a resampling process, a candidate plane can be divided into any number of smaller regions based at least in part on an accuracy threshold of the image reconstruction.

Referring now to FIG. 4G, a candidate plane 450 may be identified in scene 400 using first point 452a, second point 452b and third point 452c. As illustrated, first point 452a corresponds to a corner of the roof of house 404, while second and third points 452b, 452c correspond to ground level features of scene 400. With first point 452a is on a different surface and at a different height relative to second and third points 452b, 452c, a planar surface does not connect these points. Thus, candidate plane 450 is invalid as it includes different surfaces at different heights (depths) within scene 400. Using the techniques described above with respect to FIGS. 4-4E and performing a cost value analysis of candidate plane 450 results in a that falls outside an acceptable cost range and/or greater than the cost threshold ($<t_{th}$). Thus, candidate plane 450 can be invalidated.

Referring now to FIG. 4H, invalid candidate plane 450 is re-sampled by identifying a fourth point 452d and diving candidate plane 450 into a first candidate plane 450a, a second candidate plane 450b and a third candidate plane 450c. Similar techniques as described above for FIGS. 4-4E, can be used to validate first candidate plane 450a, second candidate plane 450b and third candidate plane 450c. In an embodiment, valid and/or invalid candidate planes can be continuously resampled until a desired accuracy threshold is reach or until there are no invalidated candidate planes. Thus, methods and techniques described herein include an iterative process to correctly map points from a first view (e.g., left view) of an image to points in a second, different view (e.g., right view) of the same image.

Figure 5:
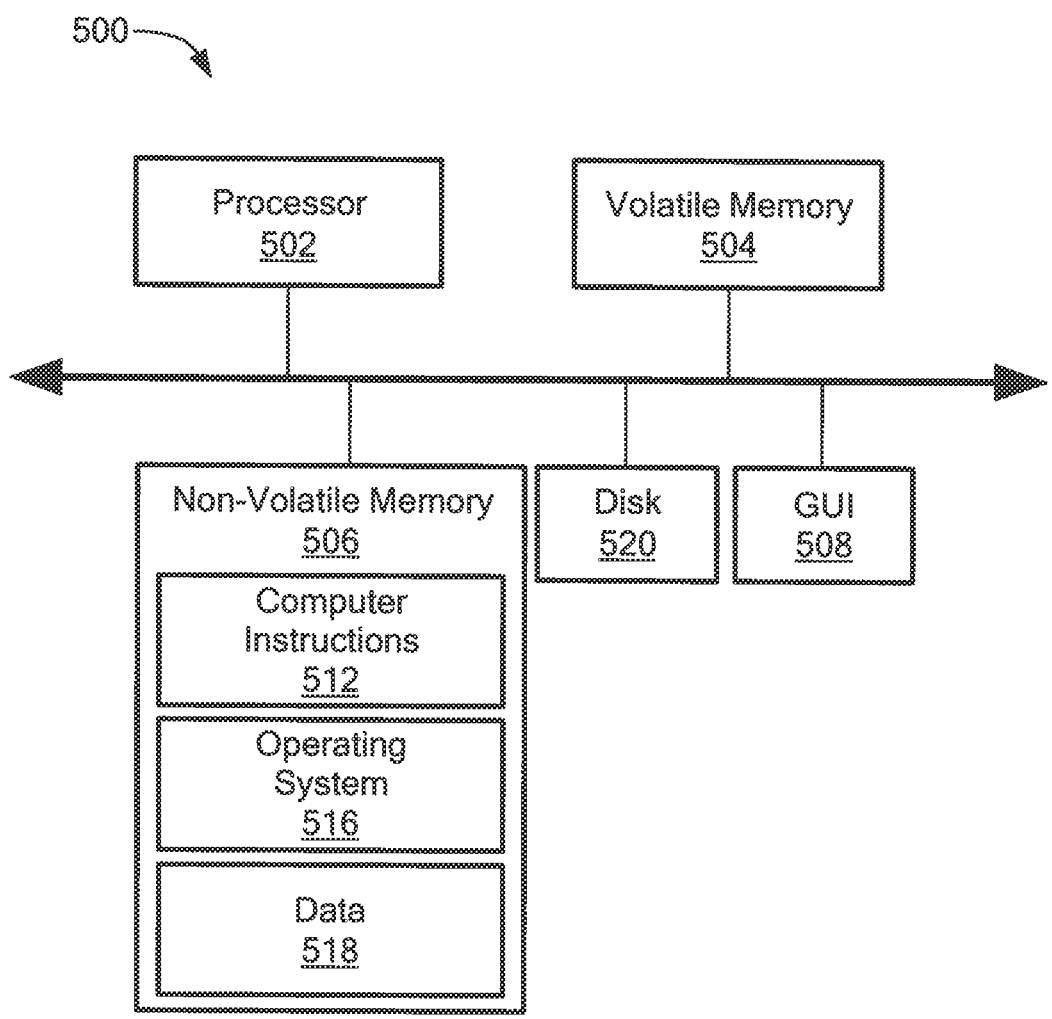
FIG. 5 is a block diagram of an embodiment of a computer system for performing tunable stereo reconstruction of an image.

Referring now to FIG. 5, a computer 500 includes a processor 502, a volatile memory 504, a non-volatile memory 506 (e.g., hard disk), a graphical user interface (GUI) 508 (e.g., a mouse, a keyboard, a display, for example) and a computer disk 520. The non-volatile memory 506 stores computer instructions 512, an operating system 516 and data 518. In an embodiment, the data 518 may correspond to disparity values and cost values determined for points and/or regions in one or more images received. In some embodiments, non-volatile memory 506 includes a look-up table that stores and organizes data corresponding to the one or more images received, for example, 3D plane parameters for candidate planes identified in a piece-wise planar mesh. In one example, the computer instructions 512 are executed by the processor 502 out of volatile memory 504 to perform all or part of the method (or process) 300 of FIG. 3.

In an embodiment, computer 500 may be the same as or substantially similar to each of the stereo reconstruction module 110, cost module 120, disparity module 130 and resampling module 140 of FIG. 1. Computer 500 may perform all of the same functions and be configured to receive and generate the same data as each of each of the stereo reconstruction module 110, cost module 120, disparity module 130 and resampling module 140 of FIG. 1, as described herein. For example, computer 500 may be configured to perform real-time stereo reconstruction of an image using, for example, the techniques described above with respect to Method 300.

Method 300 is not limited to use with the hardware and software of FIG. 5; they may find applicability in any computing or processing environment and with any type of machine or set of machines that is capable of running a computer program. Method 300 may be implemented in hardware, software, or a combination of the two. Method 300 may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform method 300 and to generate output information.

The system may be implemented, at least in part, via a computer program product, (e.g., in a machine-readable storage device), for execution by, or to control the operation of, data processing apparatus (e.g., a programmable processor, a computer, or multiple computers)). Each such program may be implemented in a high-level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment.

A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform method 300. Method 300 may also be implemented as a machine-readable storage medium, configured with a computer program, where upon execution, instructions in the computer program cause the computer to operate in accordance with method 300.

Method 300 may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

It should be noted that the techniques described herein may be applied equally well to either gray scale images or color images. In the case of a gray scale image, the value of each digital word corresponds to the intensity of the pixel and thus the image at that particular pixel location. In the case of a color image, reference is sometimes made herein to each pixel being represented by a predetermined number of bits (e.g. eight bits) which represent the color red (R bits), a predetermined number of bits (e.g. eight bits) which represent the color green (G bits) and a predetermined number of bits. (e.g. eight bits) which represent the color blue (B-bits) using the so-called RGB color scheme in which a color and luminance value for each pixel can be computed from the RGB values. Thus, in an eight-bit color RGB representation, a pixel may be represented by a twenty-four bit digital word.

It is of course possible to use greater or fewer than eight bits for each of the RGB values. It is also possible to represent color pixels using other color schemes such as a hue, saturation, brightness (HSB) scheme or a cyan, magenta, yellow, black (CMYK) scheme. It should thus be noted that the techniques described herein are applicable to a plurality of color schemes including but not limited to the above mentioned RGB, HSB, CMYK schemes as well as the Luminosity and color axes a & b (Lab) YUV color difference color coordinate system, the Karhunen-Loeve color coordinate system, the retinal cone color coordinate system and the X, Y, Z scheme. Reference is also sometimes made herein to an image as a two-dimensional pixel array. An example of an array size is size 512×512. One of ordinary skill in the art will of course recognize that the techniques described herein are applicable to various sizes and shapes of pixel arrays including irregularly shaped pixel arrays. A "scene" is an image or a single representative frame of video in which the contents and the associated relationships within the image can be assigned a semantic meaning. A still image may be represented, for example, as a pixel array having 512 rows and 512 columns.

While the concepts, systems and techniques sought to be protected have been particularly shown and described with references to illustrated embodiments thereof, it will be understood by those skilled in the art that various changes in form and details may be made therein without departing from the spirit and scope of the concepts as defined by the appended claims.

Elements of different embodiments described herein may be combined to form other embodiments not specifically set forth above. Other embodiments not specifically described herein are also within the scope of the following claims.

What is claimed:

1. A method comprising:
   identifying a plurality of points in a first image;
   determining disparity values for each of the plurality of points in the first image;
   generating a piece-wise planar mesh based on the plurality of points and their respective disparity values, wherein the piece-wise planar mesh is formed from a plurality of candidate planes;
   using estimated plane parameters for each of the plurality of candidate planes to perform disparity interpolation on the plurality of candidate planes to generate a plurality of interpolated regions;
   generating a disparity image from the plurality of interpolated regions, wherein each of the plurality of interpolated regions includes interpolated disparity values for one or more of the plurality of points in a respective interpolated region;
   determining a cost value for each of the plurality of interpolated regions based on their respective interpolated disparity values; and
   comparing the cost value for each of the plurality of interpolated regions to a cost threshold.

2. The method of claim 1, further comprising validating one or more of the plurality of interpolated regions when the respective cost value is less than the cost threshold.

3. The method of claim 1, further comprising invalidating one or more of the plurality of interpolated regions when the respective cost value is greater than or equal to the cost threshold.

4. The method of claim 1, further comprising determining a set of support points for each of the plurality of points in the first image.

5. The method of claim 4, further comprising determining a concatenation value for each of the support points.

6. The method of claim 4, further comprising generating the piece-wise planar mesh using one or more of the support points as vertices.

7. The method of claim 1, further comprising identifying triangular regions from the plurality of candidate planes and identifying 3D parameters for each of the triangular regions.

8. The method of claim 1, further comprising generating a lookup table for each of the candidate planes, wherein the lookup table includes plane coefficients for each pixel in a respective one of the plurality of candidate planes.

9. The method of claim 1, further comprising determining a grid size for each of the plurality of interpolated regions based on the respective cost value of the regions.

10. The method of claim 1, further comprising reducing a grid size of each of the plurality of interpolated regions on each subsequent iteration.

11. The method of claim 3, further comprising resampling invalidated regions.

12. The method of claim 11, further comprising identifying a plurality of points in a first region of the first image, wherein the first region has been invalidated.

13. The method of claim 12, further comprising determining disparity values for each of the plurality of points in the first region and generating a piece-wise planar mesh based on the plurality of points and their respective disparity values through Delaunay triangulation.

14. The method of claim 13, further comprising performing disparity interpolation on the plurality of candidate planes using the estimated plane parameters for each of the plurality of candidate planes and generating a disparity image having a plurality of sub-regions in the first region based on the disparity interpolation.

15. The method of claim 14, further comprising determining a cost value for each of the plurality of sub-regions based on their respective disparity values and comparing the cost value for each of the plurality of sub-regions to a cost threshold.

16. The method of claim 1, further comprising generating the piece-wise planar mesh based on the plurality of points and their respective disparity values through Delaunay triangulation.

17. A method comprising:
identifying a plurality of points in a first image and a second image that correspond to sparse salient features;
determining disparity values for each of the plurality of points in the first image;
generating a piece-wise planar mesh based on the plurality of points and their respective disparity values, wherein the piece-wise planar mesh is formed from a plurality of candidate planes;
using estimated plane parameters for each of the plurality of candidate planes to perform disparity interpolation on the plurality of candidate planes to generate a plurality of interpolated regions;
generating a disparity image from the plurality of interpolated regions, wherein each of the plurality of interpolated regions includes interpolated disparity values for one or more of the plurality of points in a respective interpolated region;
determining a cost value for each of the plurality of interpolated regions based on their respective interpolated disparity values; and
comparing the cost value for each of the plurality of interpolated regions to a cost threshold.

18. The method of claim 17, further comprising mapping the plurality of points in the first image to the plurality of points in the second image using their respective epipolar lines.

19. The method of claim 18, further comprising identifying mapping points between the first and second images using an epipolar search.

20. The method of claim 17, further comprising performing Census window-based mapping between related regions in the first image and a second image.

21. The method of claim 20, wherein the cost value for each region corresponds to a disparity between the first and second images.

* * * * *